United States Patent [19]

Wright et al.

[11] Patent Number: 4,529,220
[45] Date of Patent: Jul. 16, 1985

[54] TRAILERS

[76] Inventors: John O. Wright, 35 Heybridge St.; William Hyde, 52 Wilmay Ave., both of Auckland, New Zealand

[21] Appl. No.: 324,851

[22] Filed: Nov. 25, 1981

[30] Foreign Application Priority Data

Nov. 28, 1980 [NL] Netherlands ............... 195685
Apr. 14, 1981 [NL] Netherlands ............... 196813

[51] Int. Cl.³ .................................... B62D 63/06
[52] U.S. Cl. .................... 280/656; 280/47.22; 280/80 B; 280/767
[58] Field of Search ............ 280/656, 639, 47.21, 280/47.22, 80 B, 489, 491 R, 491 A, 491 B, 414.1, 651, 767, 63, 46; 298/5

[56] References Cited

U.S. PATENT DOCUMENTS

| | | | |
|---|---|---|---|
| 2,456,013 | 12/1948 | Nelson | 280/639 |
| 2,469,506 | 5/1949 | Kerr et al. | 280/489 |
| 3,047,305 | 7/1962 | Kleinschmidt | 280/651 |
| 3,931,987 | 1/1976 | Holliday | 280/80 B |
| 3,985,253 | 10/1976 | Kannady et al. | 298/5 |
| 4,362,316 | 12/1982 | Wright | 280/656 |
| 4,372,568 | 2/1983 | Campbell | 280/491 B |

Primary Examiner—David M. Mitchell
Attorney, Agent, or Firm—Holman & Stern

[57] ABSTRACT

A trailer comprising a load bearing section, a wheel carrying assembly and a draw bar. The load bearing section and the wheel carrying assembly are relatively displaceable between a conventional towing position (FIG. 1, FIG. 5) and a position in which the wheel carrying assembly supports the trailer in a substantially vertical disposition (FIG. 3, FIG. 7) for stowage.

12 Claims, 15 Drawing Figures

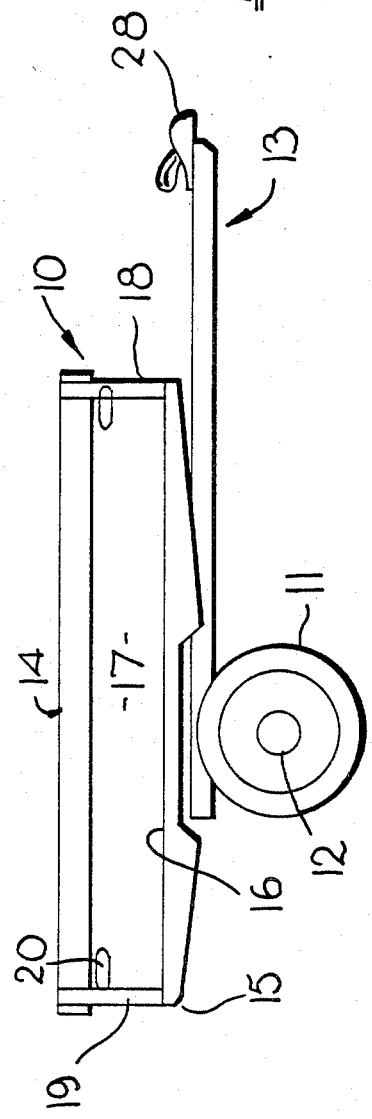
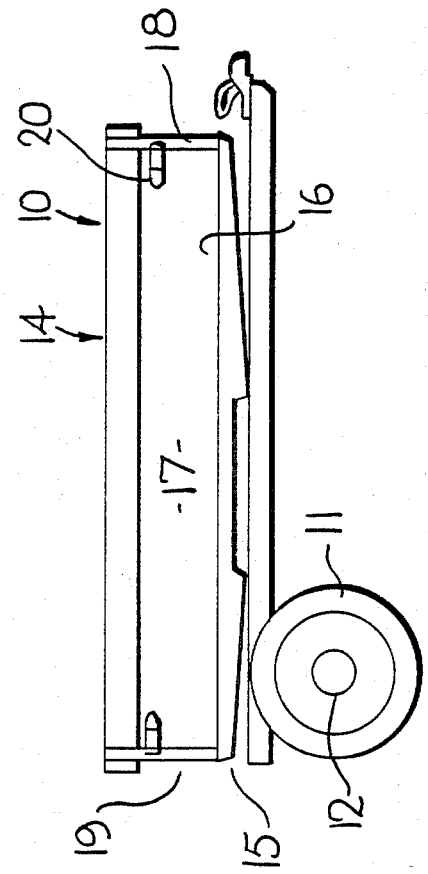

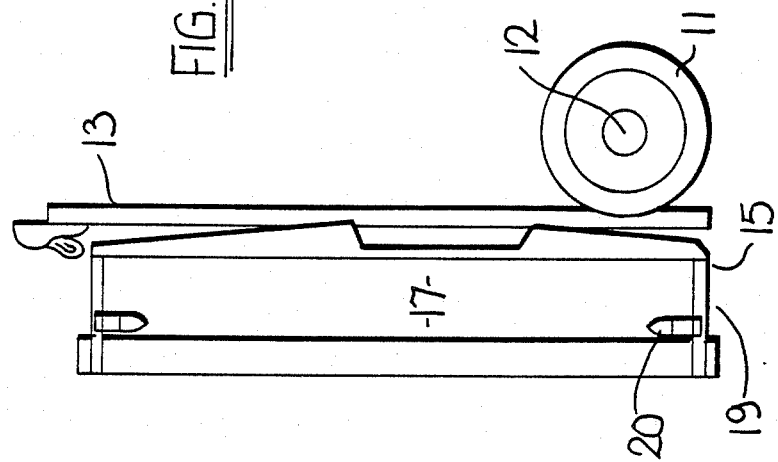
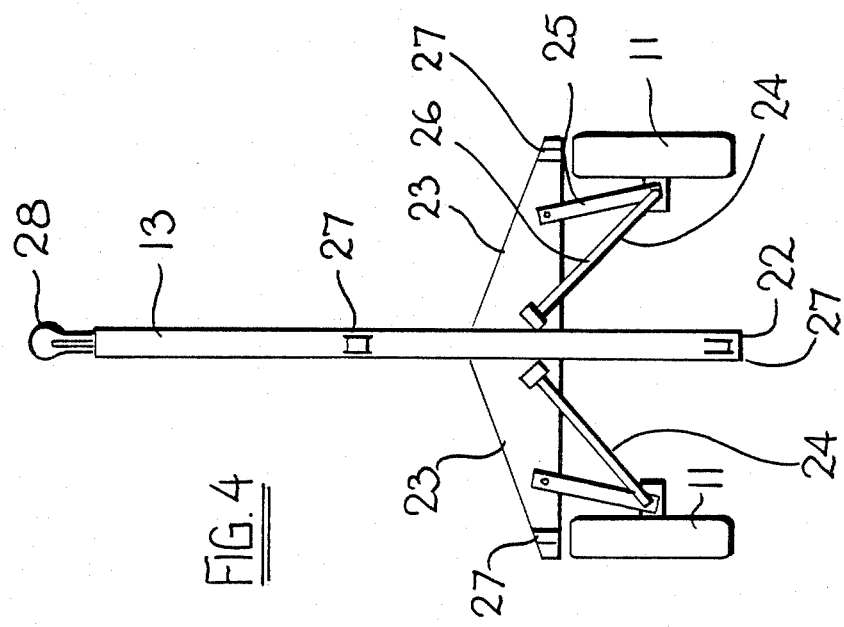

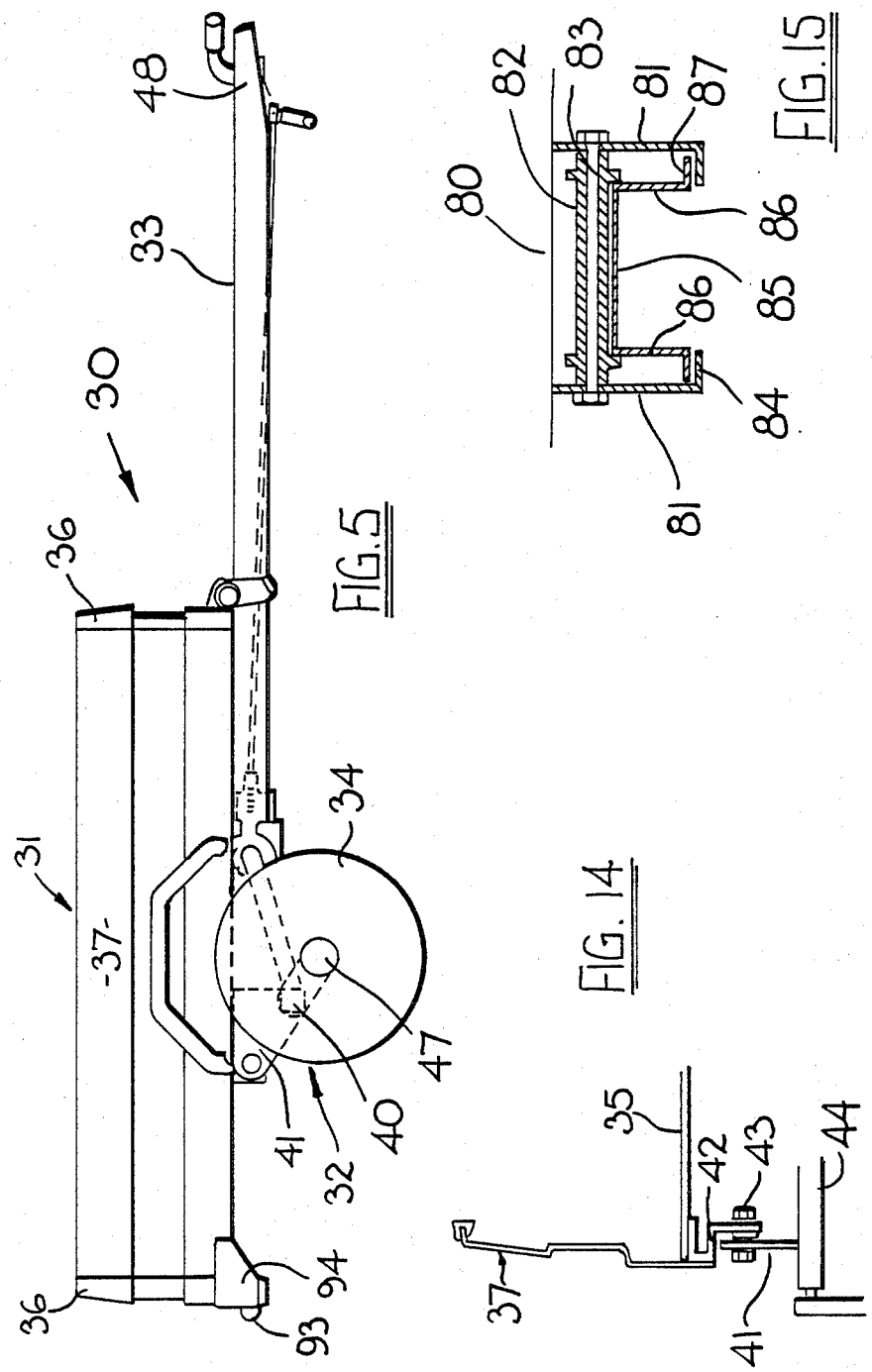

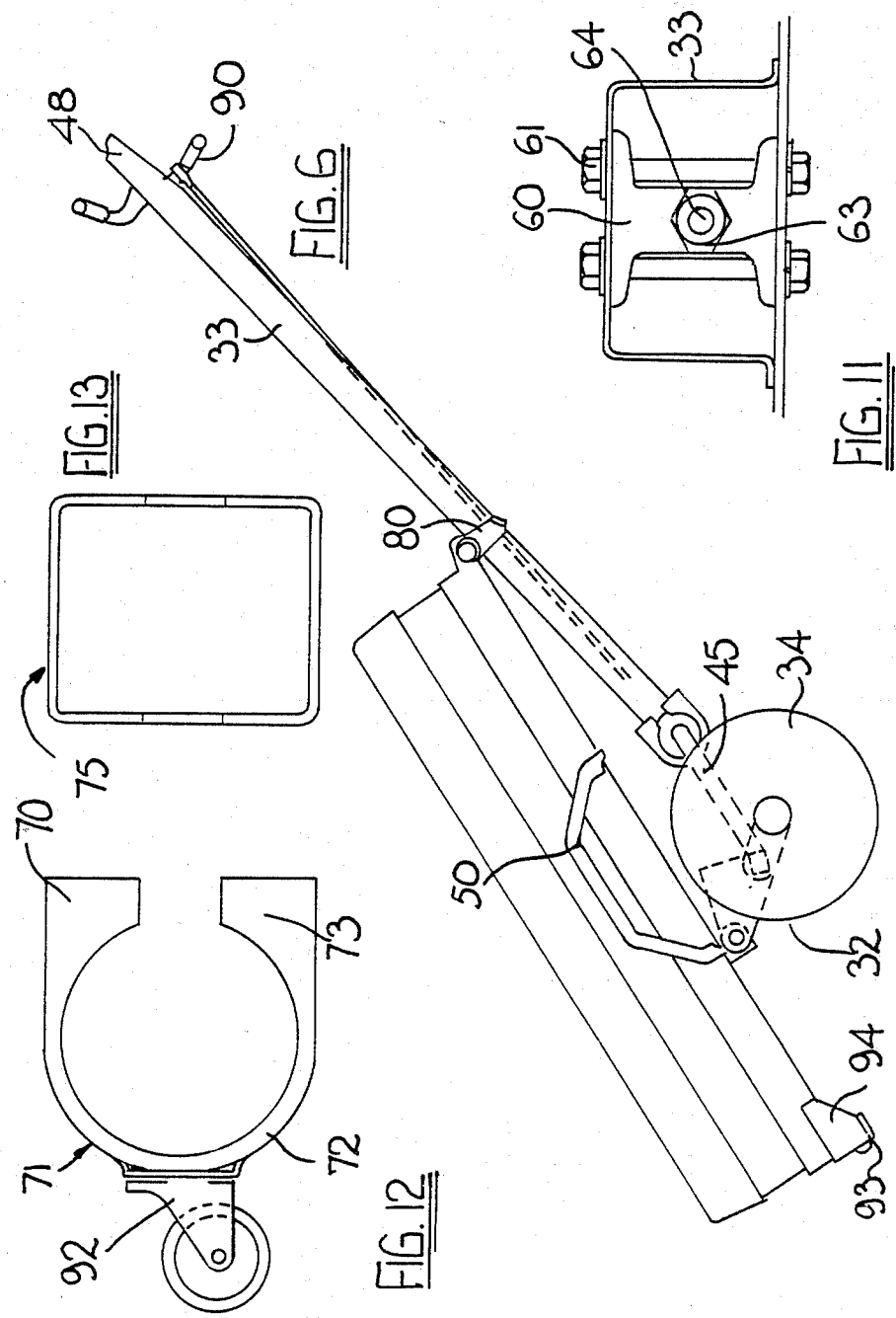

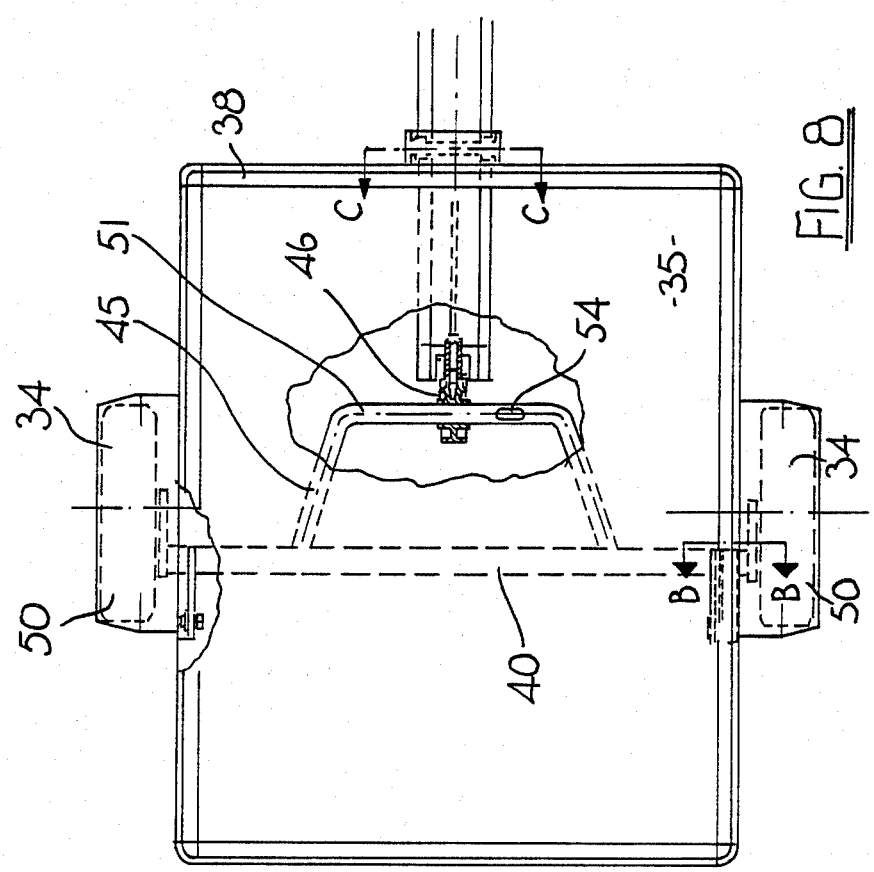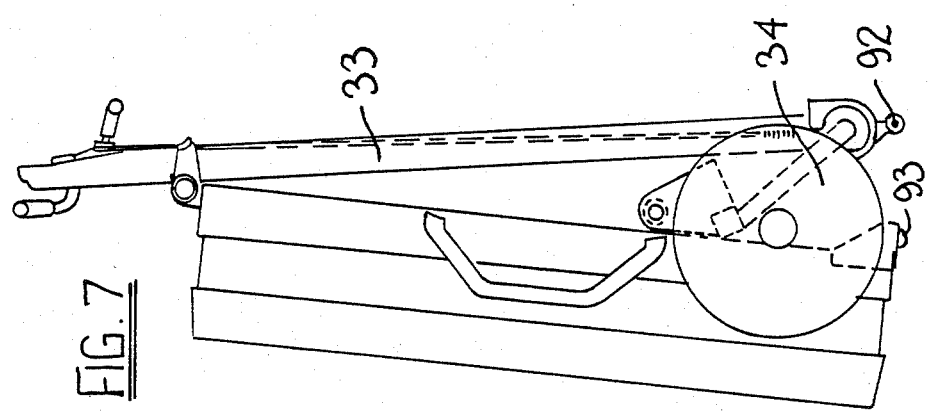

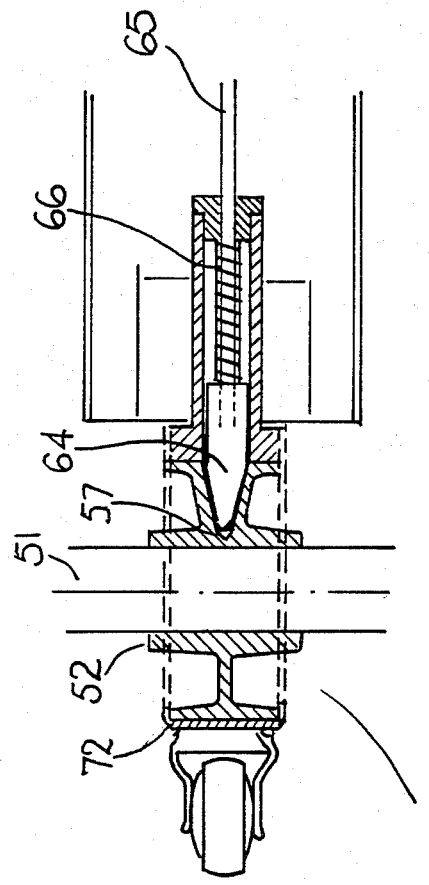
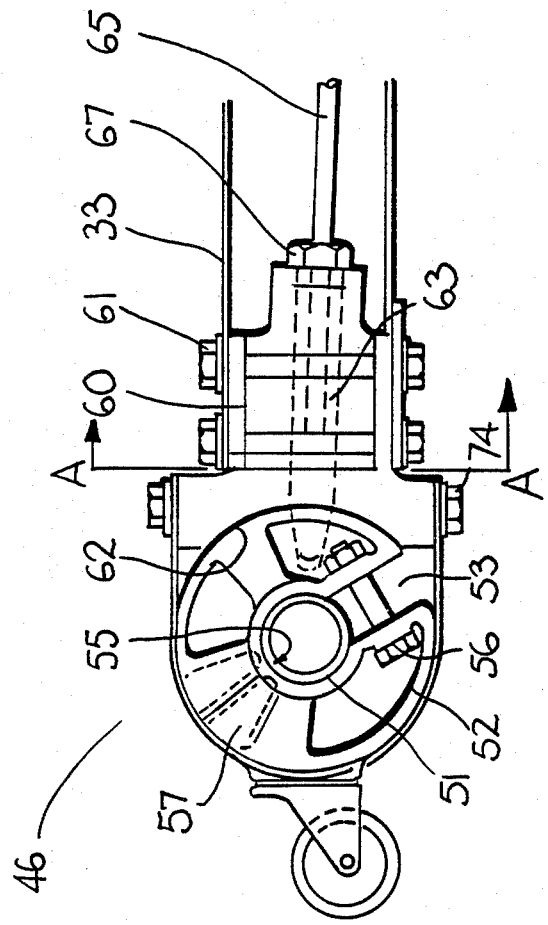

4,529,220

TRAILERS

FIELD OF THE INVENTION

This invention relates to trailers.

BRIEF SUMMARY OF THE INVENTION

It is an object of the present invention to provide a trailer.
 (i) A load bearing section;
 (ii) A wheel carrying assembly; and
 (iii) A draw bar
the load bearing section and wheel carrying assembly being displaceable with respect to one another between a first position in which said wheel carrying assembly is operable to support said load bearing section for towing in the conventional manner, and a second position in which said wheel carrying assembly is operable to support said load bearing section in a substantially vertical disposition.

To those skilled in the art to which this invention relates, many changes in construction and widely differing embodiments and applications of the invention will suggest themselves without departing from the scope of the invention as defined in the appended claims. The disclosures and the descriptions herein are purely illustrative and it is not our intention to limit the scope of the invention by those disclosures and descriptions, or otherwise, than by the terms of the appended claims.

BRIEF DESCRIPTION OF THE DRAWINGS

Two preferred forms of the invention will now be described with reference to the accompanying drawings wherein:

FIG. 1 shows a side elevational view of a first embodiment of the trailer according to the invention in the conventional position for towing;

FIG. 2 is a view similar to FIG. 1 but with the load bearing section thereof displaced with respect to the wheel carrying assembly to an alternative position;

FIG. 3 is a view similar to FIG. 2 but showing the trailer in the raised position for vertical stowage;

FIG. 4 is a top plan view showing the wheel carrying assembly and draw bar incorporated in the trailer depicted in FIGS. 1 to 3;

FIG. 5 is a side elevational view of a second embodiment of the trailer according to the invention in a conventional towing position;

FIG. 6 is a view similar to FIG. 5 but showing the trailer in an intermediate, partially stowed configuration;

FIG. 7 is a further elevational view of the trailer depicted in FIGS. 5 and 6 in a fully stowed vertical configuration;

FIG. 8 is a part sectional plan view of the trailer depicted in FIGS. 5 to 7 when in the configuration shown in FIG. 5;

FIG. 9 is an elevational view of one form of connection between the draw bar and wheel mounting assembly of the trailer shown in FIGS. 5 to 8;

FIG. 10 is a plan cross sectional view of the attachment shown in FIG. 9;

FIG. 11 is a view taken along the line A—A in FIG. 9;

FIG. 12 is an elevational view of one of the components of the connection shown in FIGS. 9 and 10;

FIG. 13 is an end elevational view of the component shown in FIG. 12.

FIG. 14 is an enlarged view taken along the line B—B in FIG. 8; and

FIG. 15 is a cross sectional view, enlarged to a greater extent, taken along the line C—C in FIG. 8.

DETAILED DESCRIPTION

Referring firstly to FIGS. 1 to 4 a trailer 10 is provided comprising a pair of wheels 11 mounted on a common axis 12, a draw bar 13 mounted so that the towing axis is substantially perpendicular to the axis 12 on which the wheels 11 are mounted, and a load bearing section 14 which is supported by the wheels 11. The assembly upon which wheels 11 are carried and the load bearing section 14 are relatively displaceable between a first position shown in FIG. 1 in which the trailer is in the conventional towing configuration, and a second position shown in FIGS. 2 and 3 in which the wheel carrying assembly can support the load bearing section in a substantially vertical configuration. It will be noted that when in the second position the rear edge 15 of the load bearing section 14 lies substantially above the rear extremities of the wheels 11 when the trailer is horizontal. The advantage of this is readily apparent from FIG. 3 and it will be noted that when the load supporting section of the trailer has been displaced to the position depicted in FIG. 2, the resulting compact combination may be simply rotated about the wheels 11 and stowed readily in a vertical position, the combination of the wheel carrying assembly and the edge 15 of the load bearing section providing a stable foundation on which the combination may rest. It will further be noted that the act of displacing the load bearing section 14 with respect to the wheel carrying assembly to the position shown in FIGS. 2 and 3, has the effect of retracting the draw bar 13 with respect to the load bearing section.

In the simplest embodiment of the invention, as shown in FIGS. 1 to 4, the load bearing section 14 is simply slidable with respect to the wheel carrying assembly along a fixed straight axis between the first and second positions.

The form of the load bearing section 14 does not constitute an essential part of the invention, however it may be in the form of a one-piece stamping or molding produced in metal, plastics such as for example ABS, fiberglass or any other suitable material. In the form shown however, the load bearing section comprises a substantially planar deck 16 with side boards 17, tow board 18 and tail board 19. The side boards 17, tow board 18 and tail board 19 are preferably metal pressings and may be pivotally mounted with respect to the deck and foldable between the positions depicted in the figures and further positions in which they lie in planes substantially parallel to and adjacent the deck 16. It will be appreciated that when the side boards, tow board and tail board are in the folded configuration they will yet further reduce the width of the trailer when in the stowed position as depicted in FIGS. 3 and 4. As shown catches 20 are provided to fasten the tow and tail boards to the side boards when in the erect position.

Referring now to FIG. 4 the draw bar 13 is as shown, rigidly fixed to the wheel carrying assembly which preferably comprises a pair of sub-frames 23. As can further be seen from FIG. 4, the rear edge 22 of the draw bar preferably extends to a line joining the rear extremities of the wheels 11. It will be appreciated that the tow bar 21 may also be reducible in length, if necessary or desirable, by making the same in two sections and having one section telescopic or foldable with respect to the other.

The sub-frames 23 extend from opposite sides of the draw bar 13 at a position intermediate the ends thereof, but nearer the end 22. The sub-frames 23 are preferably in the form of metal pressings, on which suspension units 24 are mounted which in turn mount the wheels 11 preferably through conventional dead axles. The suspension units 24 do not comprise part of the invention, but may, as shown each comprise a single trailing leaf spring 25 located by a radius rod 26. Alternatively the wheels could be mounted on torsional rubber suspension units mounted on the undersides of the sub-frames 23.

The load bearing section is supported by the chassis which in turn is defined by the draw bar 13 and the sub-frames 23 and as stated above is slidable with respect thereto, between the positions shown in FIGS. 1 and 2. When the trailer is in the position shown in FIG. 1 the center of gravity of the load bearing section 14 lies just forward of a vertical line through the axis 12 of wheels 11 to provide some downward loading on the tow coupling 28 and it will be appreciated that this center of gravity moves forward as the section 14 is displaced forward to the position shown in FIG. 2.

Many different ways of maintaining the load section 14 in engagement with the chassis will present themselves to those skilled in the art, however, by way of example suitable sectioned members (not shown) provided on the underside of the load supporting section 14 may engage in correspondingly shaped runners 27 mounted on suitable points on the tow bar 21 and the sub-frames 23. Suitable catches (not shown) are also provided on the underside of the load supporting section 14 to engage the chassis to lock the load bearing section 14 in the alternative positions as depicted in FIGS. 1 and 2.

The trailer is provided with all the necessary accessories such as coupling 28 and lights (not shown) which are preferably housed in a bumper which constitutes the rear edge 15 to comply with all the necessary Statutory requirements. These of course do not constitute part of the invention.

In use, the trailer may be used in the conventional manner by positioning the load bearing section 14 with respect to the wheel carrying assembly as shown in FIG. 1.

When it is desired to stow the trailer in, for example, a confined space, the load bearing section 14 is slid forward with respect to the wheel carrying assembly until the position shown in FIG. 2 is attained. In this position the trailer can be simply rotated in a counter-clockwise manner until the upstanding position shown in FIG. 3 is assumed.

Referring now to FIGS. 5 to 14 a further embodiment of the trailer according to the invention is provided in which the load bearing section is displaceable with respect to the wheel carrying assembly to enable the trailer to be securely supported, for stowage purposes in a substantially vertical disposition. To this end a trailer 30 is provided comprising; a load bearing section 31; a wheel carrying assembly, generally designated 32; at least one pair of wheels 34 mounted for rotation on the wheel mounting assembly 32; and a draw bar 33. Again relative movement between the load bearing section 31 and the wheel mounting assembly is provided for between a conventional towing position shown in FIG. 5 to a vertical stowed position shown in FIG. 7. An intermediate position is shown in FIG. 6.

As shown, the load bearing section 31 has a pressed metal sheet base 35 which may include longitudinal and/or lateral stiffening ribs (not shown) pressed into the surface thereof. Corner members 36 are provided at each corner of the base 35 and supported by and between the corner members 36 are side boards 37, a tow board 38 and a tail board 39. The side boards 37 are preferably fixed in position and to the base 35 while the tow board 38 and tail board 39 are preferably removable. The side boards 37, tow board 38 and the tail board 39 are all preferably sheet metal stampings or pressings, although it will be appreciated that these could also be moldings in plastics or similar moldable or formable material.

It will further be appreciated that the load carrying section 31 could be formed as a single molding or pressing in metal, plastics or fiberglass.

As shown, the wheel carrying assembly includes a cross member 40 mounted for arcuate movement with respect to the undersurface of the load bearing section 31 and, in particular, with respect to the base 35. To this end a pair of spaced, parallel mounting plates 41 project from the axis of the cross member 40 adjacent either end thereof, the plates 41 pivotally engaging a pair of brackets 42 (FIG. 14) extending from opposed points on the undersurface of the base 35, bolts 43 providing the pivotal attachment. The wheel carrying assembly further includes a pair of suspension units 44 which, in the form shown, are torsional rubber suspension units provided as extensions of the cross member 40; a U-shaped sub-frame 45 extending from the axis of the cross member 40; and connecting means 46 whereby the draw bar 33 is pivotally connected to the wheel carrying assembly.

The wheel carrying assembly 32 is preferably constructed arranged and mounted to allow for displacement of the wheels between fixed limits. Thus when the wheel mounting assembly is at the forwardmost limit, as shown in FIG. 5, the wheel axis 47 lies just behind the center of gravity of the trailer so that a small downward force exists at the coupling 48. When the wheel assembly is at the rearmost limit however, as shown in FIG. 7, a plurality of points defined by the trailer components define a support so that the trailer may be stowed in a vertical position. It will further be appreciated from viewing FIGS. 5, 6 and 7 that the act of displacing the wheel carrying assembly between the opposite limits is effected by raising the draw bar 33 to a vertical position.

As shown, when the wheel carrying assembly 32 is at the forwardmost limit the U-shaped sub-frame 45 extends forward and upward towards the under surface of the base 35 to engage the rear end of the draw bar 33. When the wheel carrying assembly is at the rearmost limit the sub-frame 45 extends rearwardly and downwardly. It will be appreciated that the arcuate movement between the forward and rearward limits pivots the wheels out from beneath mudguards 50, which are mounted on the load bearing section 31.

Referring now to FIG. 8 it will be noted that the draw bar 33 engages the cross bar 51 of the U-shaped sub-frame 45 and is pivotally connected thereto in a manner which will now be described.

Referring to FIGS. 9 to 12, a circular boss 52 is provided which is mounted on the cross bar 51. To this end the boss 52 includes an axial slot 53 which is passed over a flat section 54 (FIG. 8) provided in the cross bar 51 until the cross bar 51 engages in the central aperture 55 of the boss. The boss is then clamped in place in the center of the cross bar 51 by means of clamping bolt 56. Spaced about the periphery of the boss and preferably along radii thereof are a series of bores 57, the purpose of which will be described hereinafter.

Mounted in the rear end of the draw bar 33 is a pin mounting block 60, the pin mounting block 60 being retained in the rear end of the draw bar by means of through bolts 61. The rear end of the pin mounting block 60 extends out of the rear end of the draw bar 33 and includes an arcuately shaped rear surface 62 of a radius corresponding to the external radius of the boss 52.

Slidable within a through bore 63 in the pin mounting block 60 is a pin 64. The outer periphery of the pin 64 corresponds substantially to the form of the bores 57 provided in the boss 52 and indeed the pin 64 is shown engaged in one of the bores 57 in FIGS. 9 and 10. The pin 64 is connected to a tie rod 65 passing centrally through the draw bar and still further, the pin 64 is biased towards the periphery of the boss 52 by means of compression coil spring 66 which is retained within the bore 63 by means of retaining nut 67.

The boss 52 and the pin retaining block 60 are maintained in contact by retaining bracket 70 which is shown on its own in FIGS. 12 and 13. As can be seen the bracket 70 is substantially channel shaped in cross section and includes an arcuate rear section 71 having inward side flanges 72 which engage on either side of the boss 52. The flanges 72 merge into larger side plates 73 which engage on either side of the rear of the pin mounting block 60. The bracket 70, after being passed about the boss 52, is engaged with the rear of the pin mounting block 60 by means of bolts 74 (FIG. 9) which pass through the cross plate 75 of the bracket 70 and engage within the pin mounting block 60.

It will thus be appreciated that the connection provided by the boss 52, the pin mounting block 60 and the bracket 70 enables the draw bar 33 to be pivotally connected to the wheel carrying assembly yet allows the relative positions of the draw bar 33 and the wheel carrying assemble to be locked in various positions.

As can be seen from FIGS. 5 to 6 the draw bar 33 is engaged with the load bearing section 31 by bracket 80 provided between the point of pivotal engagement with the wheel carrying assembly and the tow coupling 48 and, as shown, preferably on the forward edge of the load bearing section 31.

Referring now to FIG. 15, the bracket 80 preferably comprises a pair of downwardly extending spaced parallel side plates 81 between which is rotatably mounted a roller 82, the roller 82 being mounted on shaft 83 supported by the side plates 81. The bottom edges of the side plates 81 carry inwardly turned flanges 84.

In the form shown the draw bar is a substantially tophat shaped member comprising a transverse top plate 85, a pair of downwardly extending side plates 86 and an outwardly turned flange 87 extending outwardly from the bottom edge of each of the side plates 86. It will be seen that the flanges 87 are enclosed within the inwardly turned flanges 84 on the sides plates 81, and thus the combination of the roller 82 and the flanges 84 retains the draw bar 33 within the bracket 80 and ensures engagement of the draw bar with the load bearing section.

Turning now to FIGS. 5 to 10 it will be noted that the tie rod 65 attached to locking pin 64 extends forward within the draw bar 33 to an actuating lever 90 provided adjacent the tow coupling 48 on the forward edge of the draw bar. Thus by turning the actuating lever 90 in a counter-clockwise direction, as viewed from the top, the pin 64 may be withdrawn from one of the bores 57 provided in the boss 52 and the boss 52 is then free to rotate with respect to the pin mounting block 60 and in turn the draw bar is free for pivotal movement with respect to the wheel carrying assembly. Since the draw bar 33 is maintained in engagement with the load bearing section by means of bracket 80, by releasing the locking pin 64 and raising the forward edge of the draw bar the whole wheel carrying assembly can be rotated in a counter-clockwise direction since the bracket 80 acts as a fulcrum. The consequence of this is that the trailer is displaced from the conventional towing position depicted in FIG. 5 to a vertical stowing position shown in FIG. 7. As can be seen, the act of moving the trailer from the configuration shown in FIG. 5 to the configuration shown in FIG. 7 withdraws the draw bar 33 with respect to the load bearing section 31 which further reduces the bulk of the trailer in the stowed configuration.

It will be appreciated that in moving the trailer between the positions shown in FIGS. 5 and 7 the wheels 33 never actually leave the ground until the very final stage of movement.

While the locking mechanism to limit movement between the wheel carrying assembly and the load carrying structure is shown and described as being provided between the draw bar 33 and the wheel carrying assembly, it will be appreciated that this catch could also be incorporated in, for example, bracket 80.

Once in the vertical position shown in FIG. 7 it may be necessary to maneuver the trailer still further and to this end as shown, is provided a castor wheel 92 on the rear edge of bracket 70 and further, a pair of spaced castors 93 are provided on the rear surface of the load bearing structure 31. The castors 93 are preferably included in a bumper 94 which further includes light units (not shown) and a number plate surround (not shown) to comply with the appropriate government regulations. Thus when the trailer is displaced to a configuration shown in FIG. 7, the folded trailer may be wheeled on the castors to any convenient location.

Thus the invention provides two embodiments of a trailer which are relatively simple in form, are used in the conventional manner yet which can be readily and easily displaced to an alternative, more compact configuration for stowage. The embodiment described with reference to FIGS. 5 to 15 including all its preferred features has the following advantages:

1. The act of displacing the trailer from the towing to the stowing configuration, gives an automatic tipping function.
2. During the folding or stowing operation the wheel assembly remains in contact with the ground right until the final stages of the operation and accordingly only the weight of the load bearing section and any loads thereon must be displaced. At the initial stages of the folding operation the folding moment is the greatest thus requiring the least effort.
3. The locking pin which locks the position of the wheel carrying assembly relative to the load bearing section self locks and yet is readily releasible.
4. When the trailer is in the stowing configuration it can be subsequently readily maneuver on castors 92 and 93.

While the trailer depicted and described takes the form of a simple box trailer this is by no means an essential part of the invention and the load bearing section could be formed to any specific purpose for example boat trailer, horse trailer, motor cycle trailer etc.

What is claimed is:

1. A trailer comprising:
   a load bearing section having a front end and a rear end;
   a wheel carrying assembly constructed and arranged to, in a first position and in association with a towing vehicle, support said load bearing section in a substantially horizontal disposition for towing in the conventional manner comprising,
   a wheel mounting axis extending transversely to the normal direction of travel of said load bearing section, and means for allowing arcuate displacement of said axis with respect to said load bearing section from said first position to a second position towards said rear end of said load bearing section;
   a pair of wheels mounted on said wheel carrying assembly at spaced positions on said wheel mounting axis;
   guide means mounted on said load bearing section adjacent the front edge thereof and projecting below the underside thereof;
   a draw bar passing through said guide means in sliding relationship therewith and projecting beyond the front end of said load bearing section, and means to pivotally connect said draw bar to said wheel carrying assembly to be displaceable therewith with respect to said load bearing section so that displacement of said wheel mounting axis from said first position to said second position displaces said draw bar through said guide means thereby reducing the projection of said draw bar beyond the front end of said load bearing section.

2. A trailer as claimed in claim 1 and further comprising means to lock said load bearing section and said wheel carrying assembly in said first and second positions.

3. A trailer as claimed in claim 1 wherein said wheel carrying assembly further comprises: a cross member; means to allow displacement of said cross member with respect to said load bearing section; said pair of wheels being mounted on said cross member a sub-frame projecting from said cross member for movement therewith; and means for pivotally connecting said draw bar to said sub-frame at a point spaced from the axis of said cross member.

4. A trailer as claimed in claim 3 wherein said means to allow arcuate displacement of said cross member comprises: a pair of spaced mounting plates on said cross member; and means to pivotally connect said plates to said load bearing section.

5. A trailer as claimed in claim 3 wherein said sub-frame comprises a substantially U-shaped member projecting from said cross member.

6. A trailer as claimed in claim 5 wherein said draw bar is pivotally connected to the cross bar of said U-shaped sub-frame.

7. A trailer as claimed in claim 6 wherein said means to pivotally connect said draw bar to said sub-frame further comprises means to lock the position of said wheel carrying assembly with respect to said load bearing section.

8. A trailer comprising:
   a load bearing section having a front end and a rear end;
   a wheel carrying assembly constructed and arranged to, in a first position and in association with a towing vehicle, support said load bearing section in a substantially horizontal disposition for towing in the conventional manner comprising,
   a cross-member having an axis extending transversely to the normal direction of travel of said load bearing section, and means for mounting said cross-member to said load bearing section for allowing arcuate displacement of said cross-member with respect to said load bearing section from said first position to a second position towards said rear end of said load bearing section;
   a pair of wheels mounted in spaced relationship on said cross-member;
   a substantially U-shaped sub-frame projecting from said cross-member for movement therewith;
   a draw bar projecting beyond the front end of said load bearing section; and
   means for pivotally connecting said draw bar with said sub-frame at a point spaced from said axis of said cross-member to be displaceable therewith with respect to said load bearing section so that displacement of said wheel carrying assembly from said first position to said second position reduces the projection of said draw bar beyond the front end of said load bearing section comprising, a boss fixed to said sub-frame, a plurality of bores through the periphery of said boss, a pin mounting block projecting from said draw bar, an arcuate shaped section on said pin mounting block for sliding engagement over the periphery of said boss, a bracket surrounding said boss and engageable with said pin mounting block to maintain the periphery of said boss in sliding engagement with the arcuate section of said pin mounting block, and a pin slidable within said pin mounting block projecting through said arcuate section of said pin mounting block to selectively engage in said bores provided through the periphery of said boss to lock the position of said wheel carrying assembly with respect to said load bearing section.

9. A trailer as claimed in claim 8 wherein the construction and arrangement is such that when said trailer is in said second position the load bearing section, wheel carrying assembly and draw bar are tiltable into a substantially vertical position wherein the wheels on said wheel carrying assembly are out of contact with the ground and said trailer is supported at least partly by the connection between said draw bar and said sub-frame.

10. A trailer as claimed in claim 9 wherein said connection between said draw bar and sub-frame includes a castor projecting from the rear edge thereof.

11. A trailer as claimed in claim 10 and further comprising: a pair of spaced castors mounted on the rear edge of said load bearing section.

12. A trailer as claimed in claim 11 and further comprising: a bumper provided across the rear edge of said load bearing section, said castors being mounted on said bumper.

* * * * *